Dec. 28, 1926.

L. ROUANET

STEERING WHEEL BRAKE

Filed Jan. 14, 1924

INVENTOR
LOUIS ROUANET
BY Francis E. Boyer
ATTORNEY

Dec. 28, 1926.  
L. ROUANET  
1,612,319  
STEERING WHEEL BRAKE  
Filed Jan. 14, 1924  
2 Sheets-Sheet 2

INVENTOR  
*LOUIS ROUANET*  
BY: *Francis E. Boyer*  
ATTORNEY

Patented Dec. 28, 1926.

1,612,319

UNITED STATES PATENT OFFICE.

LOUIS ROUANET, OF IVRY-PORT, FRANCE, ASSIGNOR TO COMPAGNIE D' APPLICATIONS MÉCANIQUES, OF PARIS, FRANCE.

STEERING-WHEEL BRAKE.

Application filed January 14, 1924, Serial No. 686,042, and in France January 26, 1923.

The present invention relates to the braking of the steering wheels of motor or other vehicles, and more particularly to the braking mechanism in which some of the members constituting the mechanism for braking one wheel, and acting by rotation, are supported by the steering swivel, while the other members are supported by the vehicle axle.

The device, according to the invention is characterized in that the braking element which carries the key or cam which actuates the segments or jaws of the brake and pivots on the steering swivel comprises a ball joint whose center is located outside the pivot axes of the steering swivel, on the side next the axis of the vehicle while the element carrying the control lever and which is supported by the axle is, on the one hand, connected with the ball joint and on the other hand, is slidable in a joint carried by the axle. In this manner, the transmission of the control of the brakes is in no wise hindered by the side steering of the wheels.

In the device according to the invention, the point of action of each control lever, i. e. the point at which said lever is connected with its operating rod, can be disposed in different places: either directly in the plane of the joint carried by the axle, or between said axle joint and the ball joint, or again, between the axle joint and the centre line of the vehicle.

In the case in which each point of action is situated directly in the plane of the joint of the corresponding axle, the side steering of the wheels causes only an imperceptible displacement of said point of action, so that the braking effect is not influenced in the road turns. This construction which is especially suitable when the braking action is to be equivalent over the whole of the wheels which are braked, admits of operating the device with or without a balancing bar.

If the point of action of each control lever is situated between the axle joint and the ball joint, when making a turn, the side steering of the wheels causes a movement in reverse directions, of each of the said points of action; this arrangement increases the braking action on the wheel situated on the inner side in the turn and it reduces it on the other wheel.

If, on the contrary, each point of action is situated between the axle joint on the centre line of the vehicle, when making a turn, the side steering of the wheels causes a movement, in reverse directions of each of the points of action; this arrangement increases the braking action on the wheel situated on the outer side in the turn and reduces it on the other wheel.

In the case in which the point of action of a control lever is situated between the axle joint and the ball joint, it will be feasible to locate on the one hand, the pivoting point on the ground, i. e. the meeting point of the axis of the steering swivel with the ground, on the point of contact of the wheel, and on the other hand, the point of action of the control lever and the ball joint, in such manner that the couple produced, upon the steering swivel, by the traction exercised on the control lever, shall be in opposition to the couple produced, upon the steering swivel, by the resistance of the braked wheel. This arrangement has the effect of eliminating or reducing the prejudicial reactions to which the steering parts are subjected.

Considering the position, in horizontal projection, of the parts of the vehicle during the travel of the latter, in straight line, the pivoting point of the wheel on the ground will be preferably situated in the same vertical plane, perpendicular to the centre line of the wheel, as the axis of the ball joint and the axis of the axle joint. But obviously, this pivoting point of the wheel on the ground might be removed out of this plane without the essential features of the arrangement being modified in any manner.

In the appended drawing which shows diagrammatically and by way of example, a number of forms of realization of the device according to the invention:

Figure 1:
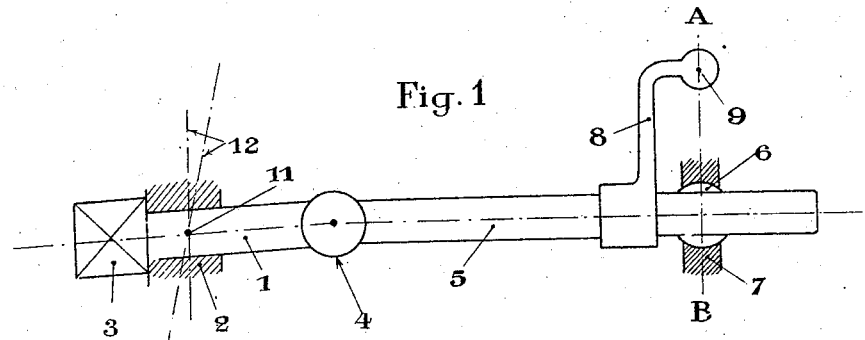
Fig. 1 is a diagrammatic elevational view of a control device for the brake of a wheel, in which the braking action is not modified in the road turns.

In the drawing, 1 is the braking element which is supported with the steering swivel 2. This part 1 carries the brake key or cam 3 and the ball joint 4 which may be a Cardan joint, a universal joint or the like. At 5 is shown the part which is supported by a joint 6 carried by the axle 7; this part 5 is connected on the other hand with the ball joint 4. In this construction, the control lever 8 is keyed to the part 5 so that the point of action 9 of the operating rod 10 shall be approximately on the vertical line A B passing through the pivoting centre 6. Obviously, the same result could be obtained either by mounting the lever 8 on the joint 6 itself, provided the latter shall be caused to rotate with the part 5, or, by pivoting the lever 8 directly to the axle 7, and in the latter case it is necessary to provide a ball joint between the lever 8 on the part 5.

Figure 2:
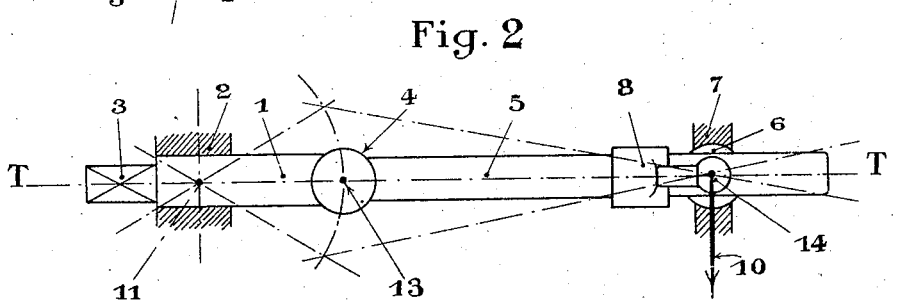
Fig. 2 is a plan view of the same.

In Figs. 1 and 2 in which is shown the device in the position corresponding to the travel of the vehicle in straight line, it will be seen that the point 11 of the steering swivel 2 whose axis 12 may be vertical or inclined, is situated in the same vertical plane T T, as the axis 13 of the ball joint 4 and the axis 14 of the joint 6.

Figure 3:
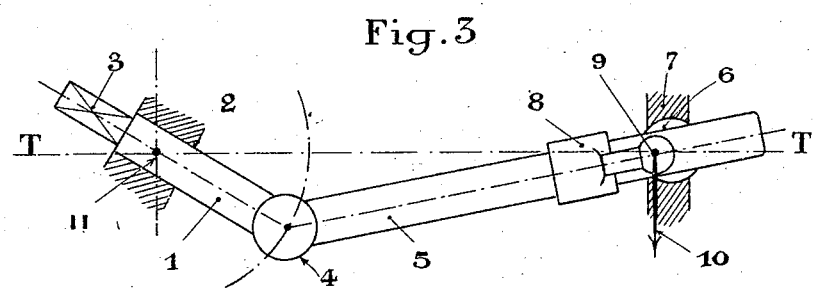
Fig. 3 is a plan view similar to that shown in Fig. 2, the parts being shown in the position which they assume on a road turn.

In Fig. 3, which shows the device in a road turn, one observes that the right-hand steering of the steering wheel causes the joint 4 to describe a curved path; this motion is allowed since the part 5 may slide in the joint 6. In this motion, the point of action 9 of the control rod 10 upon the lever 8 has not moved much away to the rear (Fig. 3), so that the braking action remains about equal, in a road turn to what takes place in straight line.

Figure 4:
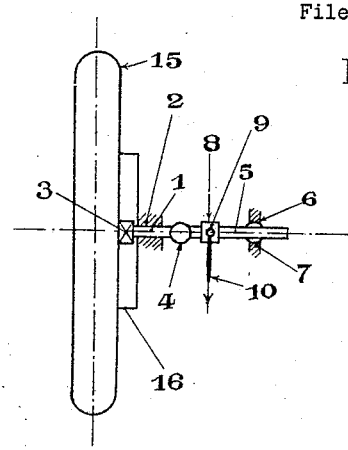
Fig. 4 is a plan view of a control device for the two brakes of a steering axle, in which the braking action is modified in the road turns.
Figure 4:
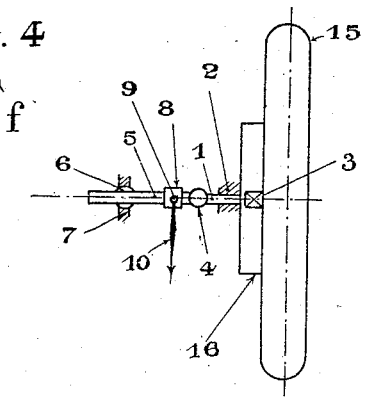
Figure 5:
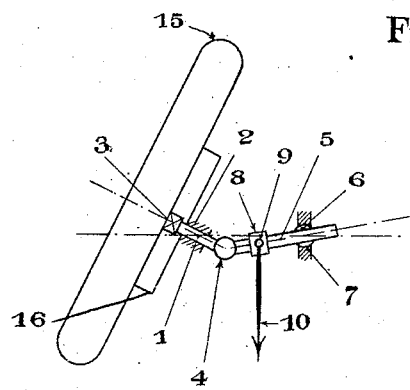
Fig. 5 is a view similar to that shown in Fig. 4, the braking parts being shown in the position which they assume in a road turn.
Figure 5:
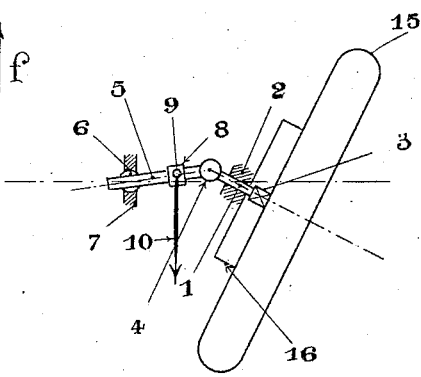

In the construction shown in Figs. 4 and 5. the point of action 9 of each control lever 8 is situated, not upon the axis 6 of the joint 6 on the axle 7, as shown in Figs. 1 to 3, but is situated between the joint 6 and the ball joint 4. In the plan view (Fig. 5) which shows the device in a road turn, with the vehicle travelling in the direction of the arrows $f$, and the braking effort taking place in the direction of the arrows 10, it is observed that the steering to the right of the steering wheels 15, carrying brake drums 16, modifies the position of each of the points of action 9. The movement of these points in reverse direction, to the front for the right hand inside wheel and to the rear for the left hand outer wheel, results in producing automatically an increase in the braking action on the inside wheel and a diminution on the outside wheel. Obviously, to obtain this result, the control of the brakes must be effected without a balance bar, and the adjustment of each brake is made so as to have an equal pressure in a straight line.

Figure 6:
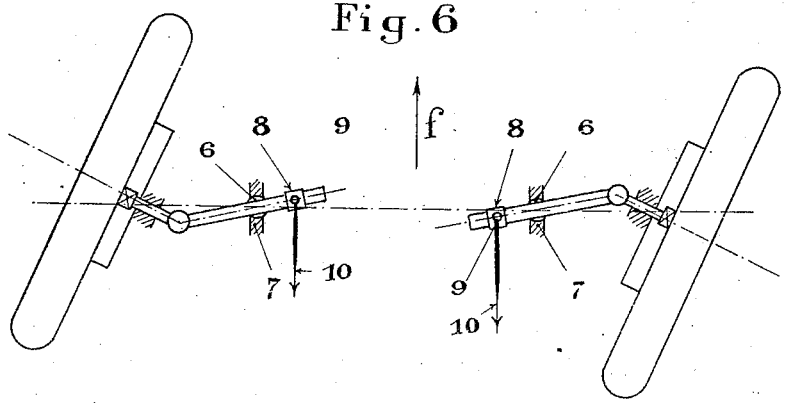
Fig. 6 is a plan view of a modification.

In the construction shown in Fig. 6, the point of action 9 of each lever 8 being located between the joint 6 and the centre line of the vehicle, the braking action in the road turns is the reverse of what occurs in the case of Fig. 5. The braking action on the outer wheel is increased and the braking action on the inner wheel is decreased.

Figure 7:
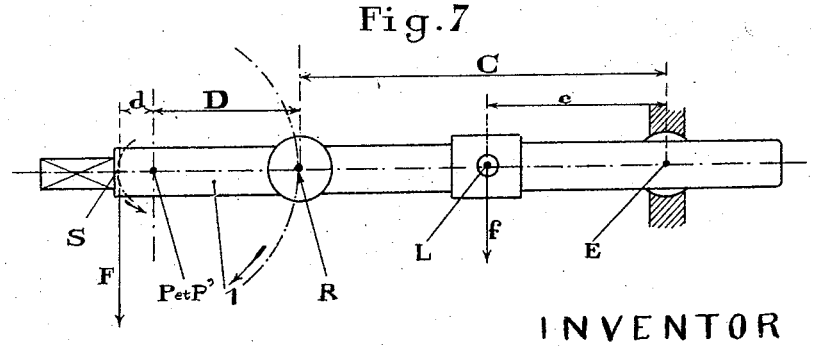
Fig. 7 is a plan view at a larger scale of one part of the device shown in Fig. 4 for the explanation of the working of the device.

Fig. 7 is a plan view which shows that the construction illustrated in Fig. 5 can be suitably designed so as to balance the reaction couples to which the steering swivel is subjected, according to the formula:

$$nd = \frac{cD}{C}$$

in which $n$ is the determined ratio between the stress exercised on the control lever and the braking stress on the ground.

In this figure, S is the point of contact of the wheel with the ground, P the point of pivoting on the ground as above defined, L the point of action of the control lever, E the axis of the axle joint, P' the pivoting point of the braking key, R the axis of the ball joint, F is the resistance of the braked wheel $d$ the distance between the point of contact of the wheel on the ground and the pivoting point on the ground, $f$ the force exercised on the control lever, $c$ the distance between the point of action of the control lever and the axis of the axle joint, D the distance between the pivoting point of the braking key and the axis of the ball joint, C the distance between the axes of the axle joint and of the ball joint.

In the state of equilibrium of the couples on the steering swivel, one will have:

$$Fd = \frac{fcD}{C}$$

and if $F = fn$ one has $$fnd = \frac{fcD}{C} \text{ or } nd = \frac{cD}{C}$$

Having now described my invention, what I claim as new and desire to secure by Letters Patent is:

1. A steering wheel braking arrangement for vehicles comprising for each wheel: a steering swivel, a braking key, a member supported by said swivel and carrying said braking key, a rigid rod having a uniform section, extending on both sides of an apertured joint supported by the axle of the vehicle and being adapted to slide in said joint, a universal joint whose center is located outside the pivot axis of the steering swivel and connecting operatively said braking key carrying member and said rod with a uniform section, and a control lever adapted to slide along said rod with a uniform section and to be secured on any of its points, whereby the different braking actions in road turns are adjustable for the wheels situated on the inner and on the outer side.

2. A steering wheel braking arrangement for vehicles comprising for each wheel: a steering swivel, a braking key, a member supported by said swivel and carrying said braking key, a rigid rod having a uniform section, extending on both sides of an apertured joint supported by the axle of the vehicle and being adapted to slide in said joint, a universal joint whose center is located outside the pivot axis of the steering swivel and connecting operatively said braking key carrying member and said rod with a uniform section, and a control lever adapted to slide along said rod with a uniform section and to be secured on any of its points, whereby the different braking actions in road turns are adjustable for the wheels situated on the inner and on the outer side, the respective positions of the meeting point of the steering swivel axis with the ground, the contact point of the wheel with the ground, the point of the control lever at which the latter is acted upon and the axis of said universal joint being such that the couples to which the steering swivel is subjected are balanced.

In testimony whereof I have signed my name to this specification.

LOUIS ROUANET.